(12) United States Patent
Gazo

(10) Patent No.: US 6,831,027 B2
(45) Date of Patent: Dec. 14, 2004

(54) PORCELAIN ENAMEL HAVING METALLIC APPEARANCE

(75) Inventor: Louis J. Gazo, Independence, OH (US)

(73) Assignee: Ferro Corporation, Cleveland, OH (US)

( * ) Notice: Subject to any disclaimer, the term of this patent is extended or adjusted under 35 U.S.C. 154(b) by 72 days.

(21) Appl. No.: 10/274,835

(22) Filed: Oct. 21, 2002

(65) Prior Publication Data
US 2004/0077477 A1 Apr. 22, 2004

(51) Int. Cl.$^7$ .............. C03C 8/18; C03C 8/02
(52) U.S. Cl. .............. 501/19; 501/14; 501/17; 501/21
(58) Field of Search .............. 501/14, 17–26

(56) References Cited

U.S. PATENT DOCUMENTS

| | | | |
|---|---|---|---|
| 2,898,253 A | | 8/1959 | Schneider et al. |
| 2,900,276 A | | 8/1959 | Long et al. |
| 2,974,051 A | | 3/1961 | Moore |
| 2,977,251 A | | 3/1961 | Long et al. |
| 3,203,815 A | * | 8/1965 | Michael .............. 501/19 |
| 3,540,896 A | * | 11/1970 | Flicker .............. 501/14 |
| 3,772,043 A | * | 11/1973 | Michael .............. 501/19 |
| 3,850,647 A | | 11/1974 | Bhat et al. |
| 4,555,415 A | | 11/1985 | Mumford et al. |
| 5,176,853 A | * | 1/1993 | Sarma et al. .............. 252/512 |
| 5,856,015 A | * | 1/1999 | Buchanan .............. 428/426 |
| 6,001,494 A | * | 12/1999 | Kuchinski et al. .............. 428/653 |

FOREIGN PATENT DOCUMENTS

DE 2829959 1/1980

OTHER PUBLICATIONS

Novamet Specialty Products Corporation. "Novamet Particulate Pigments & Fillers." promotional information dated Jan. 19, 1994.

* cited by examiner

Primary Examiner—Karl Group
Assistant Examiner—Elizabeth A. Bolden
(74) Attorney, Agent, or Firm—Rankin, Hill, Porter & Clark LLP

(57) ABSTRACT

The present invention provides a composition for use in forming a porcelain enamel coating having a metallic appearance. The composition according to the invention preferably includes a low shear blend of a glass component and metal particles such as aluminum, nickel, copper and stainless steel. The glass component includes at least one glass frit that fuses at a temperature of less than about 600° C. Upon firing at a temperature of from about 535° C. to about 600° C., the composition forms a vitreous porcelain enamel coating that has a metallic appearance, which through the incorporation of various optional pigments and/or mill additions, can range from a bright brushed nickel or stainless steel appearance to a matte dark metallic finish.

20 Claims, No Drawings

PORCELAIN ENAMEL HAVING METALLIC APPEARANCE

BACKGROUND OF THE INVENTION

1. Field of Invention

The present invention relates to a porcelain enamel coating having a metallic appearance. More particularly, the present invention relates to a composition containing a glass component and metal particles that when fired forms a porcelain enamel coating having a metallic appearance, a method of forming a porcelain enamel coating having a metallic appearance and articles having a surface provided with a porcelain enamel coating having a metallic appearance.

2. Description of Related Art

Porcelain enamel coatings have long been used to protect metal surfaces from abrasion, corrosion and other chemical and mechanical damage. Through the use of various pigments, coloring oxides and mill additions, it is possible to form decorative porcelain enamel coatings in a wide variety of colors, textures and glosses. However, prior art efforts to formulate porcelain enamel coatings having a metallic appearance have generally not met with success.

Metal particles have been added to porcelain enamel compositions in the past to form composite "cermet" coatings. As noted in Mumford et al., U.S. Pat. No. 4,555,415, the addition of metal particles, and in particular aluminum particles, to conventional porcelain enamel coating compositions results in enamels that are prone to "foaming" during their preparation, producing porous coatings. In some applications, such as the interior surface of oven cavities, such porous coatings can provide certain advantages. However, where the enamel is intended to provide a decorative coating that also protects the underlying surface from chemical and mechanical wear, such porosity is generally considered to be a disadvantage.

BRIEF SUMMARY OF THE INVENTION

The present invention provides a composition for use in forming a porcelain enamel coating having a metallic appearance. The composition according to the invention preferably comprises a low shear blend of a glass component comprising at least one glass frit that fuses at a temperature of less than about 600° C. and metal particles such as aluminum, nickel, copper and stainless steel. Upon firing at a temperature of from about 535° C. to about 600° C., the composition forms a non-porous vitreous porcelain enamel coating that has a metallic appearance, which through the incorporation of various optional pigments and/or mill additions, can range from a bright brushed nickel or stainless steel appearance to matte dark metallic finish.

In the preferred embodiment of the invention, the glass component comprises one or more glass frits comprising by weight from about 25% to about 45% $SiO_2$, from about 8% to about 30% $TiO_2$, from about 20% to about 40% $Na_2O+K_2O+Li_2O$, from about 0% to about 20% $B_2O_3$, from about 0% to about 8% $Sb_2O_5$, from about 0% to about 7% $P_2O_5$, from about 0% to about 15% $V_2O_5$, and from about 0% to about 6% BaO. Metal oxides such as oxides of cobalt, copper, manganese, nickel, iron and chrome, can be smelted into the glass to improve adhesion of the fired porcelain enamel coating to certain metal surfaces and/or to tint the resulting color of the fired porcelain enamel coating. Such a glass frit will fuse at a firing temperature of from about 535° C. to about 600° C. The preferred metal particles for use in the invention are aluminum flakes, but various other particle forms and/or metals such as copper, nickel and stainless steel can also be used.

The present invention also provides a method of forming a porcelain enamel coating having a metallic appearance and articles having a surface provided with a porcelain enamel coating having a metallic appearance. The method according to the invention comprises blending a glass component comprising at least one glass frit that fuses at a temperature of less than about 600° C. and metal particles together at low shear to form a porcelain enamel composition, applying the porcelain enamel composition to the surface, and firing the porcelain enamel composition at a temperature of from about 535° C. to about 600° C. to form the porcelain enamel coating.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Porcelain enamel coatings having a metallic appearance in accordance with the invention are obtained by blending a glass component comprising at least one glass frit that fuses at a temperature of less than about 600° C. and metal particles together at low shear. Preferably, the glass component comprises one or a blend of two or more glass frits providing a composition as shown in Table 1 below:

TABLE 1

| OXIDE | WT. % (ACCEPTABLE) | WT. % (PREFERRED) |
| --- | --- | --- |
| $SiO_2$ | 25–45 | 30–40 |
| $TiO_2$ | 8–30 | 11–25 |
| $Na_2O + K_2O + Li_2O$ | 20–40 | 25–35 |
| $Na_2O$ | 8–30 | 12–24 |
| $K_2O$ | 2–18 | 6–15 |
| $Li_2O$ | 0–11 | 1–6 |
| $B_2O_3$ | 0–20 | 0–15 |
| $V_2O_5$ | 0–15 | 5–10 |
| $Sb_2O_5$ | 0–8 | 0–5 |
| $P_2O_5$ | 0–7 | 1–4 |
| BaO | 0–6 | 0–4 |
| MgO | 0–3 | 0–2 |
| $Al_2O_3$ | 0–3 | 0–2 |
| Coloring Oxides | 0–10 | 0–5 |

The term "coloring oxides" in Table 1 refers to oxides of cobalt, copper, manganese, chrome, iron, and/or nickel, which can be smelted into the glass composition to improve adhesion of the fired porcelain enamel coating to certain metals (e.g., sheet steel) and/or to "tint" the final metallic appearance of the fired porcelain enamel coating.

The glass frit or frits that comprise the glass component may be prepared utilizing conventional glass melting techniques. A conventional ceramic refractory, fused silica, or platinum crucible may be used to prepare the glass frit. Typically, selected oxides are smelted at around 1250° C. for 30 minutes. The molten glass formed in the crucible is then converted to glass frit using water-cooled rollers and milling equipment. It will be appreciated that the step of producing the glass frit is not per se critical and any of the various techniques well known to those skilled in the art can be employed.

The metal particles that are blended with the glass component are preferably selected from the group consisting of aluminum, nickel, copper and stainless steel. Preferably, the metal particles are in the form of flakes, but other particle forms can be used (e.g., spheres). Aluminum flakes are presently most preferred for use in the invention because they tend to form a porcelain enamel coating having a bright metallic finish. Particles with a high aspect ratio are preferred.

Porcelain enamel coatings are usually applied as aqueous slips by spraying, dipping, flow coating or other conventional "wet" application means. The pH of such slips is usually in the range of from about 8.0 to about 12.0, although pH can vary widely. An exothermic gas-evolving reaction is known to occur when ordinary aluminum powder is added to an aqueous slip having an alkaline pH (aluminum reacts with water to produce hydrogen gas). Thus, it is critical that the aluminum flakes be coated or encapsulated with a protective material to prevent the gas-evolving reaction from occurring. Encapsulated aluminum flakes are commercially available from Eckart America under the HYDROLAN tradename. HYDROLAN IL 9157, which is believed to be a silica encapsulated aluminum flake material dispersed in isopropanol, is presently the most preferred aluminum flake material for use in the invention. Other encapsulation methods, such as coating the aluminum flakes with fatty acids, can also be used. To reduce the risk of removing the encapsulating material, it is important that the metal particles be blended with the glass component using low-shear mixing techniques.

Nickel, copper, and stainless steel particles can be used in conjunction with the aluminum flakes to alter the final appearance of the porcelain enamel coating. These particles can also be used to improve the abrasion resistance of the fired enamel.

By incorporating pigments as mill additions, it is possible to produce a range of enamel finishes, from a bright metallic appearance to a matte ceramic metallic appearance. Inorganic pigments, which are typically mixed metal oxides, can be added as part of the mill additions. Mearl pigments, which are available from Englehart Corporation, can also be used to produce a "metal flake" finish in the fired enamel. Mearl pigments comprise mica particles that have been treated with oxides of iron, tin, titanium, chrome and/or cobalt, to alter the surface appearance.

Preferably, the solids portion of the composition according to the invention comprises from about 65% to about 95% by weight of the glass component and from about 0.1% to about 7% by weight of metal particles. More preferably, the composition comprises from about 0.25% to about 5% by weight metal particles. At loadings greater than about 5%, the appearance of the enamel becomes matte rather than bright, and cost becomes a factor.

The solids portion of the composition can further comprise up to about 30% by weight, and more preferably up to about 20% by weight, of conventional mill additions. Preferably, such mill additions are selected from the group consisting of pigments, boric acid, molybdic acid, sodium molybdate, potassium carbonate, potassium hydroxide, potassium silicate, sodium silicate and potassium nitrate.

The firing temperature of the composition must be less than about 600° C., and more preferably from about 535° C. to about 600° C. When fired at temperatures greater than 600° C., the composition does not produce a porcelain enamel having a metallic appearance. At such elevated temperatures, the aluminum will gradually dissolve into the glass at various rates, producing colored ceramic finishes rather than the desired metallic finish. For example, when one blends a conventional glass frit for use in forming a clear or transparent enamel on mild steel and 5% by weight resistive copper particles together and then fires the composition at the at temperature above 700° C., a green enamel is formed due to the diffusion of copper metal into the glass.

Firing times will vary depending upon the thickness of the applied coating and the thickness of the substrate. Thicker gauges and applications require longer firing times. It is not advisable to raise the firing temperature above about 600° C.

Since the enamel composition according to the invention is fired at a temperature well below the melting point of aluminum (mp=660° C.), the aluminum flakes do not melt during firing. In contrast to "cermet" coatings, which have a higher concentration of metal particles and are fired at higher temperatures to produce "globules" or spheres of molten metal upon firing, the metal particles in the enamel according to the present invention retain their high aspect ratio. This is believed to be at least in part responsible for the formation of an enamel coating having a metallic appearance.

The enamel coating formed upon firing exhibits a bright metallic appearance that resembles brushed nickel or stainless steel. Incorporation of pigments and/or "coloring oxides" in the glass permits the formation of tinted coatings, such as a dark silvery metallic appearance. In addition to protecting the underlying metal layer from chemical attack and abrasion, the enamel coating according to the invention does not readily show fingerprints.

It is possible to apply the composition according to the invention to a wide variety of surfaces, including aluminum, aluminum alloys, copper, mild steel, aluminized steel, stainless steel and over conventionally fired porcelain enameled sheet steel coatings. The composition is particularly well suited for use on aluminum and aluminum alloys, which are relatively soft metals that can be scratched easily. Aluminum and aluminum alloys are often used to fabricate cookware because aluminum is relatively lightweight, rust resistant, and exhibits excellent heat transfer properties. The composition according to the invention can be applied to such surfaces to provide a hard, scratch resistant coating without sacrificing the desired bright metallic finish.

The present invention also provides a method of forming a porcelain enamel coating having a metallic appearance on a surface. The method according to the invention comprises: blending a glass component comprising at least one glass frit that fuses at a temperature of less than about 600° C. and metal particles together at low shear to form a porcelain enamel composition; applying the porcelain enamel composition to the surface; and firing the porcelain enamel composition at a temperature of from about 535° C. to about 600° C. to form the porcelain enamel coating. Preferably the porcelain enamel composition is applied to the surface by spraying, but it can be applied by any of the conventional wet application means known in the art such as, for example, dipping and flow coating.

The following examples are intended only to illustrate the invention and should not be construed as imposing limitations upon the claims.

EXAMPLE 1

Glass Frit A was prepared using conventional glass melting techniques by combining selected raw materials to provide the amounts of various oxides shown in Table 2 below and then smelting the raw materials at a temperature of about 1260–1345° C.:

TABLE 2

| OXIDE | % (Wt) |
|---|---|
| $SiO_2$ | 35.99 |
| $TiO_2$ | 15.95 |
| $Na_2O$ | 15.16 |
| $B_2O_3$ | 13.74 |
| $K_2O$ | 9.63 |
| $Li_2O$ | 3.85 |
| $Sb_2O_5$ | 2.92 |
| BaO | 1.58 |
| $P_2O_5$ | 1.18 |
| TOTAL | 100.00 |

The coefficient of thermal expansion for Glass Frit A more closely matches the coefficient of thermal expansion for steel than aluminum. Accordingly, Glass Frit A (and glasses having a similar rate of thermal expansion) are particularly suitable for use in porcelain enamel compositions that are to be applied to enamel ground coated steel substrates or aluminized steel substrates.

A porcelain enamel composition was formed by milling the components shown in Table 3 below using conventional milling techniques to a fineness of about 0.1 to about 0.3 grams being retained on a 325 mesh sieve from a 50 cubic centimeter sample:

TABLE 3

| COMPONENT | Parts by Weight |
|---|---|
| Glass Frit A | 100 |
| Water | 30 |
| Sodium Silicate | 20 |
| Sodium Molybdate | 5 |
| Potassium Carbonate | 3 |
| Molybdic Acid | 1 |

After milling, the composition was first screened through a 100 mesh sieve to remove any large particles and then water was added until the specific gravity of the composition was about 1.80. Next, 0.5 parts by weight of an aluminum powder available from Eckart America under the trade designation HYDROLAN 9157 and 3.0 parts by weight of a stainless steel powder available from Novamet were blended into the composition using a non-shear type mixer. After the metal powder was blended into the composition, the composition was screened through a 100 mesh sieve to remove any large agglomerates and then water was added until the specific gravity of the composition was about 1.70.

The porcelain enamel composition was then applied by spraying at a rate of about 14 to 20 grams per square foot to a conventional enamel ground coated section of 20 gauge sheet steel. After spraying, the coated section was dried thoroughly in a drier and then fired at a temperature of about 538° C. for about 10 minutes.

After firing, the enameled section of sheet steel exhibited a bright metallic appearance that looked very similar to brushed nickel or stainless steel. The scratch resistance of the coating was evaluated by running a steel point across the surface. The non-enameled section of sheet steel showed evidence of marking whereas the enameled section did not.

EXAMPLE 2

Glass Frit B was prepared using conventional glass melting techniques by combining selected raw materials to provide the amounts of various oxides shown in Table 4 below and then smelting the raw materials at a temperature of about 1260–1345° C.:

TABLE 4

| OXIDE | % (Wt) |
|---|---|
| $SiO_2$ | 34.55 |
| $Na_2O$ | 21.08 |
| $TiO_2$ | 15.92 |
| $K_2O$ | 9.28 |
| $V_2O_5$ | 6.20 |
| BaO | 3.39 |
| $Li_2O$ | 3.26 |
| $Sb_2O_5$ | 2.59 |
| $P_2O_5$ | 2.43 |
| $B_2O_3$ | 1.30 |
| TOTAL | 100.00 |

The coefficient of thermal expansion for Glass Frit B more closely matches the coefficient of thermal expansion for aluminum than steel. Accordingly, Glass Frit B (and glasses having a similar rate of thermal expansion) are particularly suitable for use in porcelain enamel compositions that are to be applied to aluminum and aluminum alloy substrates.

A porcelain enamel composition was formed by milling the components shown in Table 5 below using conventional milling techniques to a fineness of about 0.1 to about 0.3 grams being retained on a 325 mesh sieve from a 50 cubic centimeter sample:

TABLE 5

| COMPONENT | Parts by Weight |
|---|---|
| Glass Frit B | 100 |
| Water | 32 |
| Boric Acid | 3 |
| Potassium Hydroxide | 2.5 |
| Sodium Silicate | 2.5 |
| Potassium Nitrate | 0.1 |

After milling, the porcelain enamel composition was first screened through a 100 mesh sieve to remove any large particles and then water was added until the specific gravity of the composition was about 1.80. Next, 2.5 parts by weight a an aluminum powder available from Eckart America under the trade designation HYDROLAN 9157 were blended into the composition using a non-shear type mixer. After the metal powder was blended into the composition, the composition was screened through a 100 mesh sieve to remove any agglomerates and then water was added until the specific gravity of the composition was about 1.70.

The porcelain enamel composition was then applied by spraying at a rate of about 14 to 20 grams per square foot to a cleaned 20 mil thick section of 3003 aluminum alloy. After spraying, the coated section of aluminum alloy was dried thoroughly in a drier and then fired at a temperature of about 554° C. for about 8 minutes. After firing, the enameled section of aluminum alloy exhibited a bright metallic appearance that looked very similar to brushed nickel. The coating was more scratch resistant than 3003 aluminum alloy.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A composition for use in forming a porcelain enamel coating having a metallic appearance, the composition comprising:

from about 65% to about 95% by weight of a glass component comprising at least one glass frit that fuses at a temperature of less than about 600° C.;

wherein the glass frit comprises by weight from about 25% to about 45% $SiO_2$, from about 8% to about 30% $TiO_2$, from about 20% to about 40% $Na_2O+K_2O+Li_2O$, from about 0% to about 20% $B_2O_3$, from about 0% to about 8% $Sb_2O_5$, from about 0% to about 7% $P_2O_5$, from about 0% to about 15% $V_2O_5$, and from about 0% to about 6% BaO;

and from about 0.01% to about 7% by weight of metal particles.

2. The composition according to claim 1 further comprising up to about 30% by weight of mill additions.

3. The composition according to claim 2 wherein the mill additions comprise one or more selected from the group consisting of boric acid, molybdic acid, sodium molybdate, potassium carbonate, potassium hydroxide, potassium silicate, sodium silicate and potassium nitrate.

4. The composition according to claim 1 wherein the metal particles comprise particles of one or more selected from the group consisting of aluminum, nickel, copper and stainless steel.

5. The composition according to claim 4 wherein the metal particles are in the form of flakes.

6. The composition according to claim 1 wherein the metal particles comprise encapsulated aluminum flakes.

7. The composition according to claim 6 wherein the aluminum flakes are encapsulated with a fatty acid or silica.

8. The composition of claim 1 comprising about 0.25% to about 5.0% by weight of metal particles.

9. The composition of claim 1 wherein the at least one glass frit fuses at a temperature of from about 538° C. to about 554° C.

10. The composition of claim 1 wherein the glass frit comprises by weight:

about 34.5% $SiO_2$, about 21.1% $Na_2O$, about 15.9% $TiO_2$, about 9.3% $K_2O$, about 6.2% $V_2O_5$, about 3.4% BaO, about 3.3% $Li_2O$, about 2.6% $Sb_2O_5$, about 2.4% $P_2O_5$, about 1.3% $B_2O_3$, and, from about 0.01% to about 7% by weight of metal particles.

11. A composition for use in forming a porcelain enamel coating having a metallic appearance, the composition comprising:

from about 65% to about 95% by weight of a glass component comprising at least one glass frit that fuses at a temperature of less than about 600° C.;

wherein the glass frit comprises by weight from about 30% to about 40% $SiO_2$, from about 11% to about 25% $TiO_2$, from about 12% to about 24% $Na_2O$, from about 6% to about 15% $K_2O$, from about 5% to about 10% $V_2O_5$, from about 1% to about 6% $Li_2O$, from about 0% to about 15% $B_2O_3$, from about 0% to about 5% $Sb_2O_5$, from about 1% to about 4% $P_2O_5$, from about 0% to about 3% MgO, from about 0% to about 2% $Al_2O_3$, and from about 0% to about 5% coloring oxides;

and from about 0.01% to about 7% by weight of metal particles.

12. The composition according to claim 11 further comprising up to about 30% by weight of mill additions.

13. The composition according to claim 12 wherein the mill additions comprise one or more selected from the group consisting of boric acid, molybdic acid, sodium molybdate, potassium carbonate, potassium hydroxide, potassium silicate, sodium silicate and potassium nitrate.

14. The composition according to claim 11 wherein the metal particles comprise particles of one or more selected from the group consisting of aluminum, nickel, copper and stainless steel.

15. The composition according to claim 14 wherein the metal particles are in the form of flakes.

16. The composition according to claim 11 wherein the metal particles comprise encapsulated aluminum flakes.

17. The composition according to claim 16 wherein the aluminum flakes are encapsulated with a fatty acid or silica.

18. The composition according to claim 11 comprising from about 0.25% to about 5.0% by weight of metal particles.

19. The composition according to claim 11 wherein the at least one glass frit fuses at a temperature of from about 538° C. to about 554° C.

20. A composition for use in forming a porcelain enamel coating having a metallic appearance, the composition comprising:

from about 65% to about 95% by weight of a glass component comprising at least one glass frit that fuses at a temperature of less than about 600° C.;

wherein the glass frit comprises by weight about 35.9% $SiO_2$, about 16% $TiO_2$, about 15.2% $Na_2O$, about 13.7% $B_2O_3$, about 9.6% $K_2O$, about 3.9% $Li_2O$, about 2.9% $Sb_2O_5$, about 1.6% BaO, and about 1.2% $P_2O_5$, and from about 0.01% to about 7% by weight of metal particles.

* * * * *